US012000211B2

(12) United States Patent
Mittanck et al.

(10) Patent No.: US 12,000,211 B2
(45) Date of Patent: Jun. 4, 2024

(54) STEP LADDER WITH ADJUSTABLE TRAY

(71) Applicant: WING ENTERPRISES, INCORPORATED, Springville, UT (US)

(72) Inventors: Travis Mittanck, Springville, UT (US); B. Scott Maxfield, Mapleton, UT (US); N. Ryan Moss, Mapleton, UT (US); Steven S. Miner, Springville, UT (US)

(73) Assignee: LITTLE GIANT LADDER SYSTEMS, LLC, Springville, UT (US)

(*) Notice: Subject to any disclaimer, the term of this patent is extended or adjusted under 35 U.S.C. 154(b) by 434 days.

(21) Appl. No.: 16/891,937

(22) Filed: Jun. 3, 2020

(65) Prior Publication Data

US 2020/0386050 A1 Dec. 10, 2020

Related U.S. Application Data

(60) Provisional application No. 62/857,149, filed on Jun. 4, 2019.

(51) Int. Cl.
*E06C 1/393* (2006.01)
*E06C 1/383* (2006.01)

(52) U.S. Cl.
CPC .............. *E06C 1/393* (2013.01); *E06C 1/383* (2013.01)

(58) Field of Classification Search
CPC . E06C 1/393; E06C 1/383; E06C 7/14; E06C 7/50; E06C 7/182; E06C 7/00; E06C 5/32
See application file for complete search history.

(56) References Cited

U.S. PATENT DOCUMENTS 199,004 A * 1/1878 Udell ...................... E06C 1/393 182/124
237,349 A * 2/1881 Webster .................... E06C 1/32 182/124
382,102 A * 5/1888 McLaughlin ........... E06C 1/393 182/126

(Continued)

FOREIGN PATENT DOCUMENTS

CA 2037875 A1 9/1992
CN 209976451 U 1/2020
KR 200146389 Y1 6/1999

OTHER PUBLICATIONS

International Search Report and Written Opinion for PCT/US2020/035766, dated Aug. 7, 2020.

(Continued)

*Primary Examiner* — Jessica L Laux
*Assistant Examiner* — Kathleen M. McFarland
(74) *Attorney, Agent, or Firm* — Dorsey & Whitney LLP

(57) ABSTRACT

Embodiments of ladders and adjustable trays are provided herein. In accordance with one embodiment, a ladder includes a first pair of spaced apart rails having one or more rungs extending between and coupled with the first pair of spaced apart rails. A top cap is coupled with the first pair of spaced apart rails. A second pair of spaced apart rails is coupled with the first pair of rails via a pair of hinges. A tray is hingedly coupled with the top cap and selectively positioned between a first deployed position and a stored position, wherein when the tray is in the stored position the tray extends downwards from the top cap towards the pair of hinges.

22 Claims, 11 Drawing Sheets

(56) References Cited

U.S. PATENT DOCUMENTS

| | | | | |
|---|---|---|---|---|
| 523,709 | A * | 7/1894 | Leach | E06C 1/393 182/123 |
| 1,934,086 | A * | 11/1933 | Page | E06C 1/16 182/129 |
| 2,109,886 | A * | 3/1938 | Lewis | E06C 1/393 182/124 |
| 2,470,053 | A * | 5/1949 | Salisbury | E06C 1/32 182/120 |
| 3,189,123 | A * | 6/1965 | Bond | E06C 1/393 182/125 |
| 5,062,179 | A * | 11/1991 | Huang | F16C 11/10 403/93 |
| 5,419,409 | A * | 5/1995 | Corulla | E06C 7/16 182/174 |
| 5,505,302 | A * | 4/1996 | Ferley | B25H 3/02 248/210 |
| 5,520,474 | A * | 5/1996 | Liu | F16C 11/10 403/92 |
| 5,542,151 | A * | 8/1996 | Stranski | A47D 13/063 16/329 |
| 5,603,405 | A * | 2/1997 | Smith | B25H 3/02 206/349 |
| 5,639,003 | A * | 6/1997 | Utzinger, III | A45F 3/00 224/904 |
| 5,722,507 | A * | 3/1998 | Kain | E06C 1/393 182/104 |
| 5,740,883 | A * | 4/1998 | Trank | E06C 7/14 248/210 |
| 5,782,314 | A * | 7/1998 | Zeitler | E06C 7/14 248/210 |
| 5,913,380 | A * | 6/1999 | Gugel | E06C 7/182 248/210 |
| 5,941,344 | A * | 8/1999 | Spadaro | E06C 7/14 248/210 |
| 6,086,284 | A * | 7/2000 | Callahan | F16C 11/10 403/103 |
| 6,443,260 | B1 * | 9/2002 | Katz | E06C 7/14 248/238 |
| 7,032,711 | B1 * | 4/2006 | Katz | B25H 3/06 248/238 |
| 7,063,187 | B1 * | 6/2006 | Lavigne | E06C 1/39 248/238 |
| 7,264,084 | B1 * | 9/2007 | Switzer | E06C 7/14 248/238 |
| 7,424,933 | B2 * | 9/2008 | Weiss | E06C 7/42 182/163 |
| 7,617,569 | B2 * | 11/2009 | Liao | E06C 1/32 16/334 |
| 7,931,123 | B2 * | 4/2011 | Moldthan | E06C 1/387 182/161 |
| 7,984,790 | B2 * | 7/2011 | Meyers | E06C 1/393 182/163 |
| 8,186,481 | B2 * | 5/2012 | Moss | E06C 7/50 182/25 |
| 8,453,796 | B2 * | 6/2013 | Astor | E06C 7/00 182/119 |
| 8,579,083 | B2 * | 11/2013 | Astor | E06C 7/14 182/115 |
| 9,163,455 | B2 * | 10/2015 | Moss | E06C 7/50 |
| 9,422,767 | B2 * | 8/2016 | Russell | E06C 1/16 |
| 9,714,542 | B1 * | 7/2017 | Harcz | E06C 7/14 |
| 9,784,033 | B2 * | 10/2017 | Moss | E06C 7/50 |
| 9,850,706 | B2 * | 12/2017 | Astor | E06C 7/14 |
| 10,138,680 | B2 * | 11/2018 | Williams | E06C 7/14 |
| 10,767,417 | B2 * | 9/2020 | Andrade | A47B 5/04 |
| 10,807,407 | B1 * | 10/2020 | Huynh | B44D 3/12 |
| 11,299,934 | B2 * | 4/2022 | Brown | E06C 1/393 |
| 2003/0029676 | A1 * | 2/2003 | Gibson | E06C 1/393 182/161 |
| 2003/0077111 | A1 * | 4/2003 | Cheng | B62B 9/20 403/101 |
| 2005/0274575 | A1 * | 12/2005 | Gibson | E06C 7/14 182/129 |
| 2006/0070806 | A1 * | 4/2006 | Simpson | E06C 7/14 182/129 |
| 2007/0284191 | A1 * | 12/2007 | Astor | E06C 7/14 182/129 |
| 2008/0142301 | A1 * | 6/2008 | Meyers | E06C 7/14 182/180.1 |
| 2009/0078504 | A1 * | 3/2009 | Astor | E06C 1/39 182/129 |
| 2009/0229918 | A1 * | 9/2009 | Moss | E06C 7/14 182/180.1 |
| 2017/0234069 | A1 * | 8/2017 | Pfeifer | B25H 3/06 248/238 |
| 2017/0328131 | A1 * | 11/2017 | Woodward | E06C 1/393 |
| 2018/0023345 | A1 * | 1/2018 | Andrade | A47B 5/04 108/25 |
| 2018/0030783 | A1 * | 2/2018 | Moss | E06C 1/22 |
| 2018/0187488 | A1 * | 7/2018 | Mora | E06C 1/18 |
| 2018/0238113 | A1 * | 8/2018 | Wulfekotte | E06C 7/16 |
| 2018/0298691 | A1 * | 10/2018 | Cook | E06C 7/083 |
| 2020/0165869 | A1 * | 5/2020 | Brown | E06C 1/20 |
| 2020/0190905 | A1 * | 6/2020 | Foley | E06C 7/16 |
| 2020/0217134 | A1 * | 7/2020 | Fortier | F16B 7/105 |
| 2020/0254605 | A1 | 8/2020 | Mcgee | |
| 2020/0263497 | A1 * | 8/2020 | Leng | E06C 7/14 |
| 2020/0270946 | A1 * | 8/2020 | Lawery | B44D 3/125 |
| 2020/0386050 | A1 * | 12/2020 | Mittanck | E06C 7/50 |
| 2021/0254406 | A1 * | 8/2021 | Brown | E06C 1/393 |
| 2022/0145700 | A1 | 5/2022 | Major et al. | |
| 2022/0195801 | A1 * | 6/2022 | Gericke | E06C 7/14 |

OTHER PUBLICATIONS

PCT/US2023/082191 International Search Report and Written Opinion dated Mar. 15, 2024 (12 pages).

* cited by examiner

STEP LADDER WITH ADJUSTABLE TRAY

CROSS-REFERENCE TO RELATED APPLICATION

This application claims the benefit of U.S. Provisional Patent Application No. 62/857,149, entitled STEP LADDER WITH ADJUSTABLE TRAY, filed on Jun. 4, 2019, the disclosure of which is incorporated by reference herein in its entirety.

BACKGROUND

The present disclosure relates generally to ladders and, more particularly, to embodiments of step ladders having adjustable components and incorporating locking hinge mechanisms.

Ladders are conventionally utilized to provide a user thereof with improved access to elevated locations that might otherwise be inaccessible. Ladders come in many shapes and sizes, such as straight ladders, straight extension ladders, step ladders, and combination step and extension ladders. So-called combination ladders may incorporate, in a single ladder, many of the benefits of multiple ladder designs.

Ladders known as step ladders are self-supporting, meaning that they do not need to be leaned against a wall, pole or other structure for stability. Rather, step ladders may be positioned on a floor (or other similar surface) such that at least three, and conventionally four, feet of the ladder provide a stable support structure for a user to climb upon, even in an open space (e.g., outside or in the middle of a room) without a wall, roof, pole or other type of structure being necessary for the stability of the ladder.

Accessories for ladders are often provided as structures that are either fixed (e.g., non-adjustable) relative to other portions of the ladder, or are provided as "add-ons" meaning that they are coupled to the ladder for use, and are removable for storage when not in use. Either approach in providing an accessory for a ladder can be less than ideal for the user.

It is a continued desire within the industry to provide ladders and ladder components that are safe, durable and effective tools for a user thereof. Many efforts have been and continue to be expended in an effort to improve the performance of ladders, improve the associated manufacturing processes and to provide the end user with a good experience when using ladders.

SUMMARY

Embodiments of the present disclosure include ladders and adjustable trays used with ladders. In one embodiment, a stepladder may include an adjustable tray integrated therewith. For example, in accordance with one embodiment, a ladder is provided that includes a first pair of spaced apart rails, at least one rung extending between and coupled with the first pair of spaced apart rails, a top cap coupled with the first pair of spaced apart rails, a second pair of spaced apart rails, and a pair of hinges coupling the first pair of spaced apart rails with the second pair of spaced apart rails. The ladder further includes a tray hingedly coupled with the top cap and selectively positioned between a first deployed position and a stored position, wherein when the tray is in the stored position the tray extends downwards from the top cap towards the pair of hinges.

In accordance with one embodiment, the tray includes a body portion defining an interior volume and at least one panel coupled with the body portion and configured to cover the interior volume.

In accordance with one embodiment, the ladder further includes at least one adjustment mechanism associated with the tray configured to selectively lock the tray in the first deployed position and the stored position.

In accordance with one embodiment, the adjustment mechanism includes an actuator lever positioned along a lower side of the tray.

In accordance with one embodiment, the actuator lever is further positioned along a laterally outer side of the tray adjacent to a rail of the first pair of spaced apart rails.

In accordance with one embodiment, the actuator lever is coupled with a locking key that extends along an axis of rotation between the tray and the top cap.

In accordance with one embodiment, the locking key includes a body portion having at least one tooth formed thereon, and wherein the top cap includes at least one notch, the at least one tooth being configured to selectively engage the at least one notch.

In accordance with one embodiment, the at least one tooth includes at least a first tooth having a first radial length and a second tooth having a second radial length, wherein the first radial length is greater than the second radial length.

In accordance with one embodiment, the actuator lever includes a camming surface that engages a cam follower of the locking key.

In accordance with one embodiment, the ladder further includes a biasing member positioned between a portion of the actuator lever and a portion of the locking key.

In accordance with one embodiment, rotation of the actuator lever about the axis of rotation displaces the locking key axially along the axis of rotation.

In accordance with one embodiment, the actuator lever is configured to rotate about the axis of rotation approximately 22.5 degrees or less.

In accordance with one embodiment, the first pair of spaced apart rails and the second pair of spaced apart rails are configured to be positioned relative to each other in a first, deployed state and a second, stored state, wherein when the second, stored state the first pair of spaced apart rails are positioned adjacent to and extend substantially parallel to the second pair of spaced apart rails.

In accordance with one embodiment, a maximum depth of the ladder when first pair of spaced apart rails and the second pair of spaced apart rails are in the second, stored state, and when the tray is in the stored position is defined by a distance between a front surface of the first pair of spaced apart rails and a rear surface of the second pair of spaced apart rails.

In accordance with one embodiment, when in the first, deployed position, the tray extends substantially horizontally from the top cap.

In accordance with one embodiment, the tray is selectively positioned in at least a second, deployed position, wherein, when in the second deployed position, the tray extends generally upward from the top cap and generally parallel with a plane defined by a front face of the first pair of spaced apart rails.

In accordance with one embodiment, when in the first deployed position, the tray extends generally upward from the top cap and generally parallel with a plane defined by a front face of the first pair of spaced apart rails.

In accordance with one embodiment, the ladder further includes a platform step extending between and coupled with the first pair of spaced apart rails.

In accordance with one embodiment, the top cap does not contact the second pair of spaced part rails.

In accordance with one embodiment, the top cap includes at least one storage compartment.

It is noted that aspects, features and components of one described embodiment may be combined with aspects, features or components of other defined embodiments herein.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
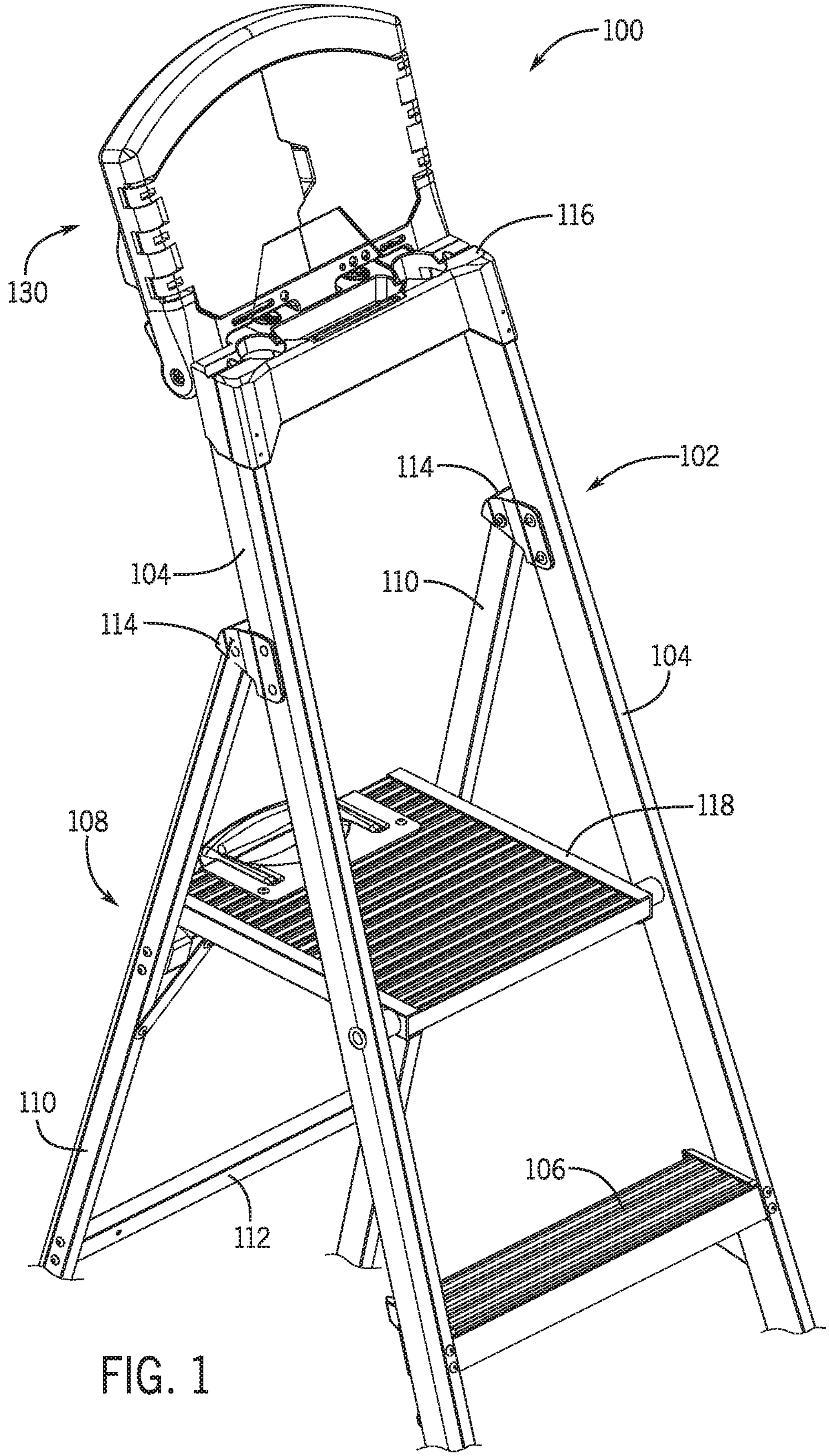
FIG. 1 is a perspective view of an upper portion of a step ladder having a tray in a first position or state according to an embodiment of the present disclosure.
Figure 2:
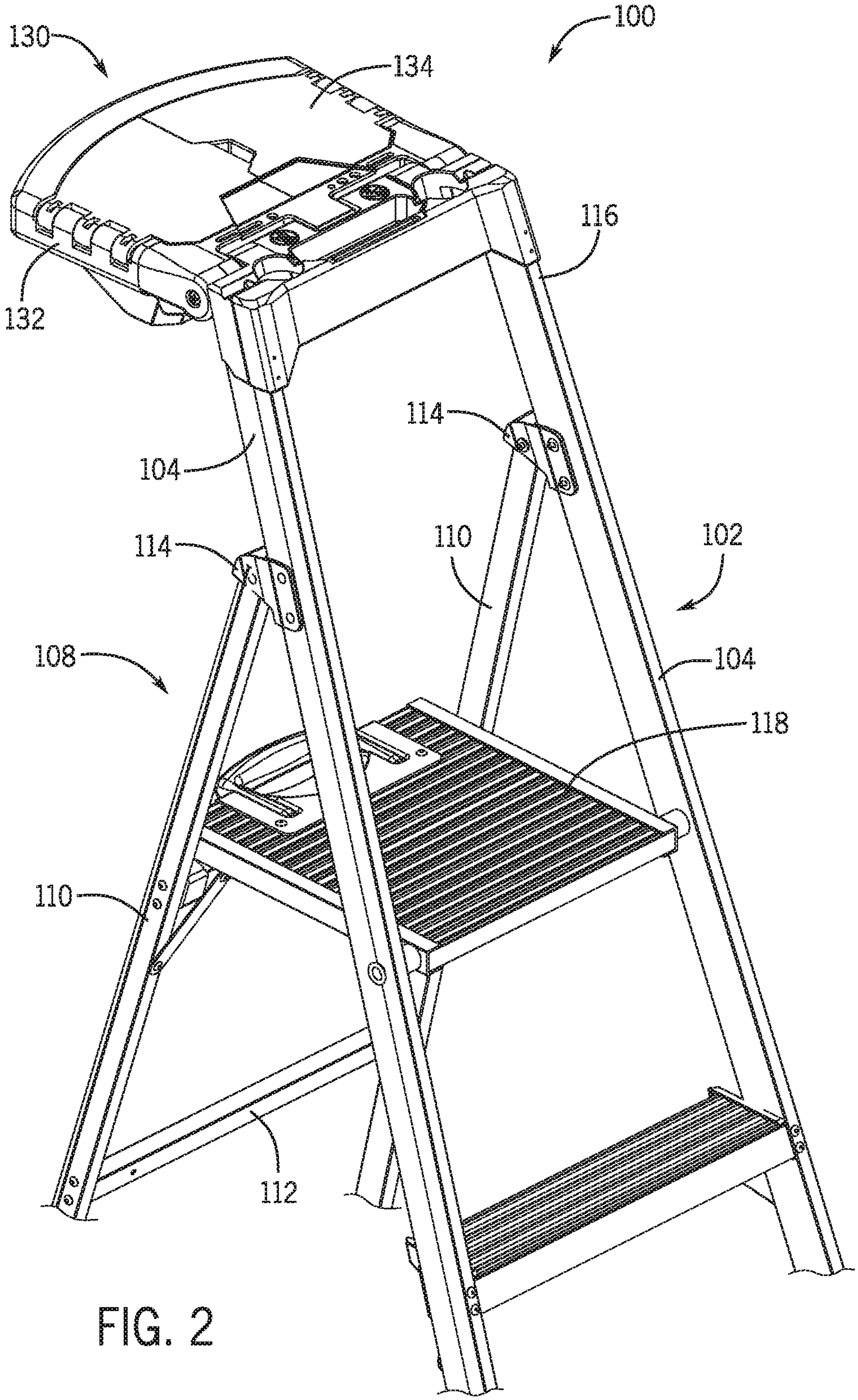
FIG. 2 is a perspective view of the step ladder shown in FIG. 1 with the tray in a second position or state.
Figure 3:
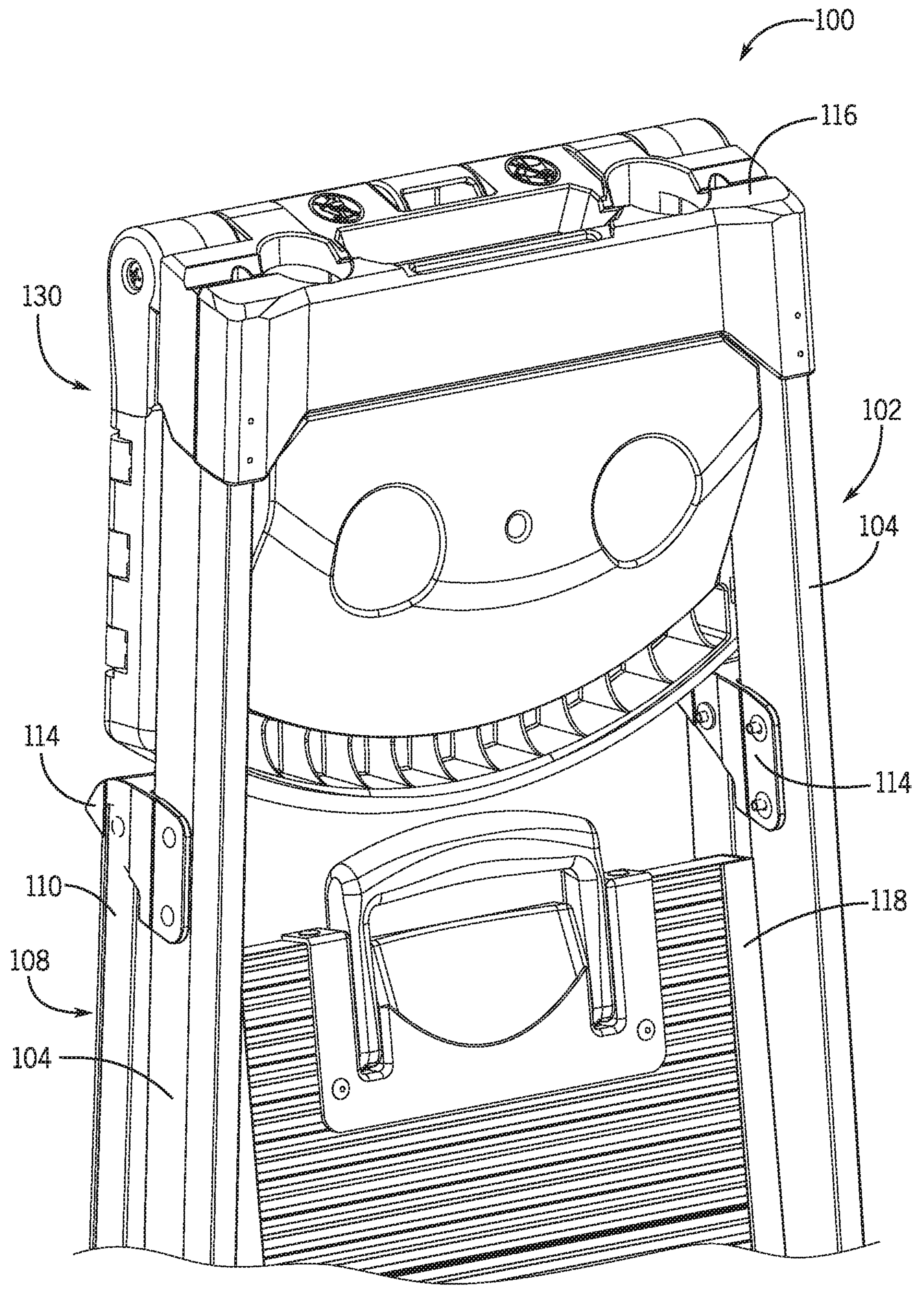
FIG. 3 is a perspective view of the step ladder shown in FIG. 1 with the tray in a third position or state.

Referring to FIGS. 1-3, a ladder 100 is shown in accordance with an embodiment of the present invention. The ladder 100 shown in FIG. 1 is configured generally as a platform type step ladder and includes a first assembly 102 having a pair of spaced apart rails 104 and a plurality of rungs 106 extending between, and coupled to, the rails 104 (e.g., by mechanical fastener, adhesive or material joining techniques). The rungs 106 are substantially evenly spaced, parallel to one another, and are configured to be substantially level when the ladder 100 is in an orientation for intended use, so that they may be used as "steps" to support a user as they ascend the ladder 100 and as will be appreciated by those of ordinary skill in the art. In various embodiments, the upper surface of the rungs 106 may include traction features (e.g., grooves and ridges, grip tape, rubberized coverings or other anti-slip features) to provide traction to a user while standing on the rungs 106.

The ladder 100 also includes a second assembly 108 having a pair of spaced apart rails 110. The second assembly 108 may also include cross-members 112 or other structural components that extend between the rails 110 to provide a desired level of structural support and strength to the spaced apart rails 110. In some embodiments, the cross-members 112 of the second assembly 108 may be configured as rungs to support a user. The second assembly 108, thus, may be used to help support the ladder 100 when in an intended operational state, such as depicted generally in FIG. 1.

In the embodiment shown in FIG. 1, hinged or pivoting connections 114 (also referred to as hinges) couple the first rail assembly 102 and the second rail assembly 108 together such that the two assemblies 102 and 108 may be folded or collapsed into a stored or stowed state (see FIG. 3). When in a stowed state, the first rail assembly 102 and the second rail assembly 108 are positioned adjacent each other in a relatively thin profile, such as will be appreciated by those of ordinary skill in the art.

It is noted that in the embodiment shown in FIG. 1, the rails 104 of the first assembly 102 extend substantially beyond the hinged connections 114 and are coupled with a top cap 116. In such an embodiment, the extended rails 104 and the top cap 116 may be used as a storage tray for tools, supplies or other materials. Additionally, the top cap 116 may be used as a handrail to help support or balance a user when they are standing on the ladder 100. It is noted, however, the various features and aspects of the present invention are applicable to, and contemplated as being incorporated with, other types of ladders including, for example, step ladders having a conventional top cap that is directly coupled to both of the first and second assemblies, as well as with extension ladders, straight ladders, combination ladders or other types of ladders. Some nonlimiting examples of step ladders and related components that may be utilized in accordance with embodiments of the present invention include those described by U.S. Patent Publication No. US2018/0298691, published Oct. 18, 2018, and U.S. Pat. No. 9,422,767 issued on Aug. 23, 2106, the disclosures of which are incorporated by reference herein in their entireties.

In the embodiment shown in FIG. 1, a platform 118 is positioned above the rungs 106 and extends from the rails 104 of the first assembly 102 to the rails 110 of the second assembly 108. The platform 118 may be configured to support all, or at least a substantial portion, of a user's feet, thereby providing a comfortable and safe working surface to the user. In the presently described embodiment, the platform 118 is hingedly coupled to the rails 104 of the first assembly 102 and engages a cross-member 112 associated with the second assembly 108. In one embodiment, the platform 118 may simply rest on the associated cross-member 112. In another embodiment, a locking member may be used to selectively couple the platform 118 and the associated cross-member 112 in a deployed state or position.

The first and second assemblies 102 and 108 may be formed of a variety of materials and using a variety of manufacturing techniques. For example, in one embodiment, the rails 104 and 110 may be formed of a composite material, such as fiberglass, while the rungs and other structural components may be formed of aluminum or an aluminum alloy. In other embodiments, substantially all of the components of the assemblies may be formed of aluminum or an aluminum alloy. In other embodiments, the assemblies 102 and 108 (and their various components) may be formed of other materials including other composites, plastics, polymers, various metals and metal alloys.

The ladder 100 may also include various bracing, structural reinforcement members and other components such as described in the previously incorporated U.S. Patent Publication No. US2018/0298691 and U.S. Pat. No. 9,422,767.

The ladder 100 further includes an accessory, which may also be referred as a tray 130, coupled with top cap 116. In some embodiments, the tray 130 may be coupled to the rails 104 of the first assembly 102 at a location between the hinges 114 and the top cap 116. The tray 130 may be selectively positioned and maintained such that it extends upward from the top cap 116 as shown in FIG. 1 (referred to herein as a deployed position, or a first deployed position). Additionally, the tray 130 may be selectively positioned and maintained such that it extends laterally outward (generally horizontally) from the top cap 116 as shown in FIG. 2 (also referred to as a deployed position, or a second deployed position). Further, the tray 130 may be selectively positioned and maintained such that it extends downward from the top cap 116 as shown in FIG. 4, such that it is positioned immediately adjacent (and can even abut) the upper portions of the rails 104 of the first assembly 102 above the hinges 114 (referred to as a stored position).

Figure 4:
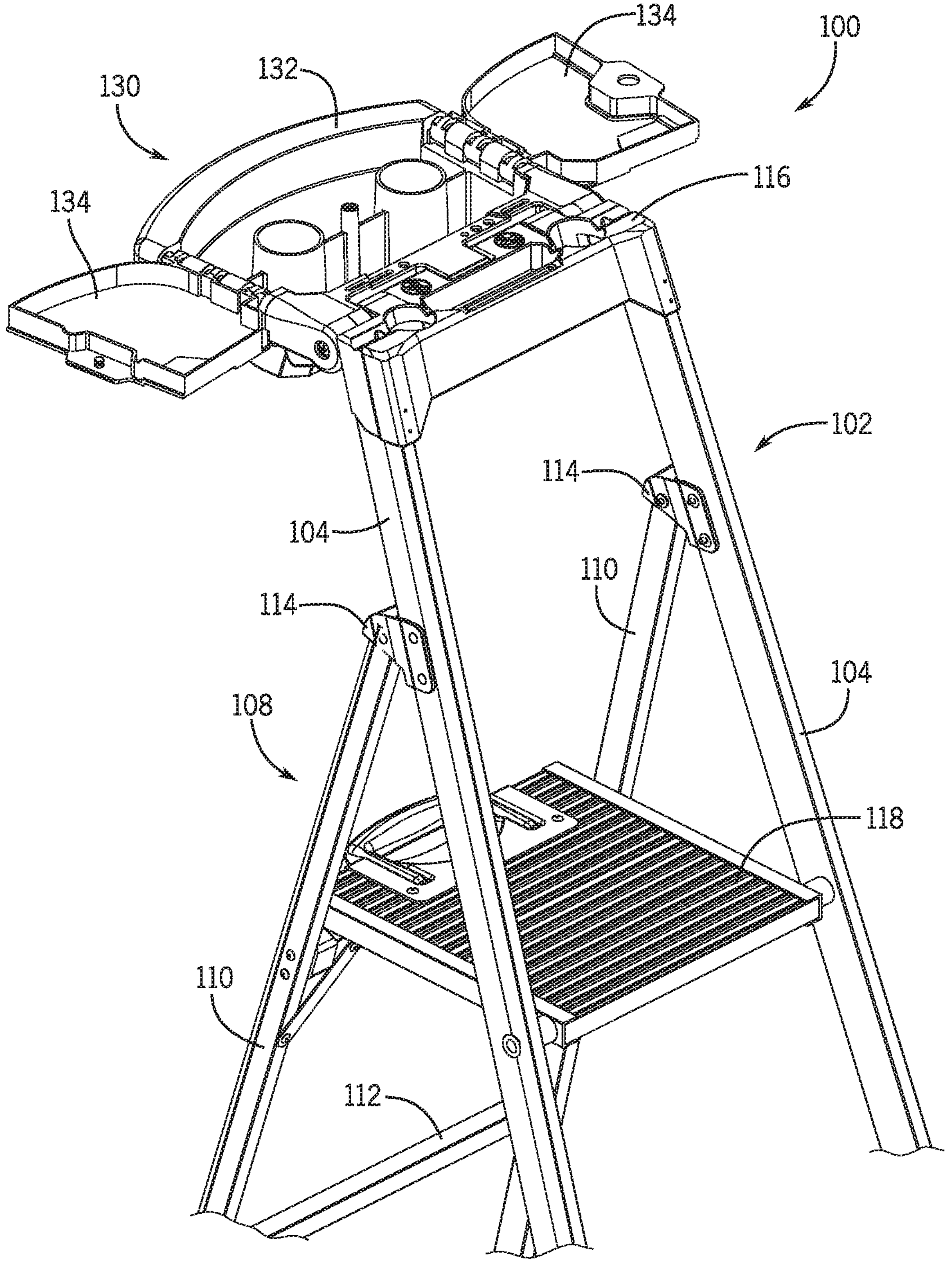
FIG. 4 is a perspective view of the step ladder shown in FIG. 1 with the ladder in a second configuration or state and with the tray in a fourth position or state.

In one embodiment, when in the position shown in FIG. 4 (which may be referred to as a stored position), the tray 130 may by positioned such that it does not extend beyond the plane defined by the rearmost surfaces the rails 110 of the second assembly 108. Thus, when the ladder 100 is collapsed and the tray 130 is in the stored position (both shown in FIG. 3), the ladder may maintain a substantially constant thickness or depth at the upper portion (including the rails 104 of the first assembly 102 and the tray 130) and at a lower portion (including the rails 104 of the first assembly 102 and the rails 110 of the second assembly 108).

Referring to FIGS. 2 and 4, the tray 130 may have a body portion 132 and one or more panels 134 hingedly coupled with the body portion 132. The panels 134 may be selectively placed in a closed position or state, as seen in FIG. 2, and maintained in the closed state by way of a closure device or a locking device. Such a locking device may include a detent mechanism, a latch mechanism, an interference fit between the two panels or any other suitable mechanism or device. The panels 134 may additionally be pivoted or otherwise displaced to an open position or state as seen in FIG. 4. When in the open position, an interior volume of the body portion 132 is exposed. The interior volume may be configured to store and/or organize a variety of supplies and/or tools. The interior volume may include individual compartments (as clearly shown in FIG. 4) to hold various components. When the panels 134 are closed (as shown in FIGS. 1, 2 and 3), any contents placed within the interior volume may be held in place by the panels 134 and stored for later use.

When the tray 130 is in the first deployed position, as shown in FIG. 1, the tray 130 may act as an elevated handle or a rail for a user to grasp and support or steady themselves when, for example, they are standing on the platform 118.

When the tray 130 is in the second deployed position, as shown in FIGS. 2 and 4, the tray 130 may be used as a support for holding tools or supplies. For example, as noted above, with the panels 134 open, tools or supplies located within the interior volume may be accessed. However, even with the panels 134 in the closed position, as shown in FIG. 2, a user may temporarily place tools or supplies (e.g., hand tools, power tools, paint cans, fasteners, etc.) on top of the panels 134 for easy access and convenience while standing on one of the rungs 106 or the platform 118.

When the tray 130 is in the stored position, it is collapsed against the upper portion of the rails 104 of the first assembly 102 so as to provide a slim profile, enabling the ladder 100 to be easily transported and stored. In some embodiments, the tray 130 may contact or abut the rails 104 of the first assembly 102 when in the stored position. In one embodiment, the tray 130 may be contained within the volumetric envelope defined by the front surfaces of the rails 104 of the first assembly and the rear surfaces of the rails 110 of the second assembly 108.

In some embodiments, the tray 130 may be configured without panels. In such an embodiment, the tray may still include recesses, bins, or other storage compartments for holding tools or supplies, for example, when the tray is in the second, deployed position. Additionally, the tray may include openings or other structures or components to hold tools (e.g., screwdrivers, pliers, hammers, power tools, extension cords, etc.). In other embodiments, the tray may have a substantially flat surface to support supplies or tools, for example, when in the second, deployed position.

Referring now to FIGS. 5-11, addition details are shown and described with respect to the tray 130, its connection to the top cap 116 and adjustment mechanisms that enable the tray 130 to be selectively positioned and maintained in selected positions relative to the top cap 116. The tray 130 is pivotally coupled with the top cap 116 about a defined axis 140. It is noted that, while the embodiments shown and described herein depict the tray 130 pivotally coupled with the top cap 116, that the tray 130 may be coupled to other components of the ladder 100 including, for example, the rails 104 of the first assembly 102 by way of appropriate brackets.

A pair of adjustment mechanisms 142, also referred to as a selective locking mechanisms, are associated with the tray 130 to enable selective positioning of the tray 130 relative to the top cap 116. Each adjustment mechanism 142 may be located at a laterally outer portion of the tray 130, generally aligned with rails 104 of the first assembly 102. While a pair of adjustment mechanisms are used (see, e.g., FIG. 10), only a single adjustment mechanism 142 is shown in FIGS. 5-9 and 11 for purposes of simplicity and clarity. Each of the adjustment mechanisms 142 may be configured similar to one another (e.g., as mirror images of each other).

Figure 5:
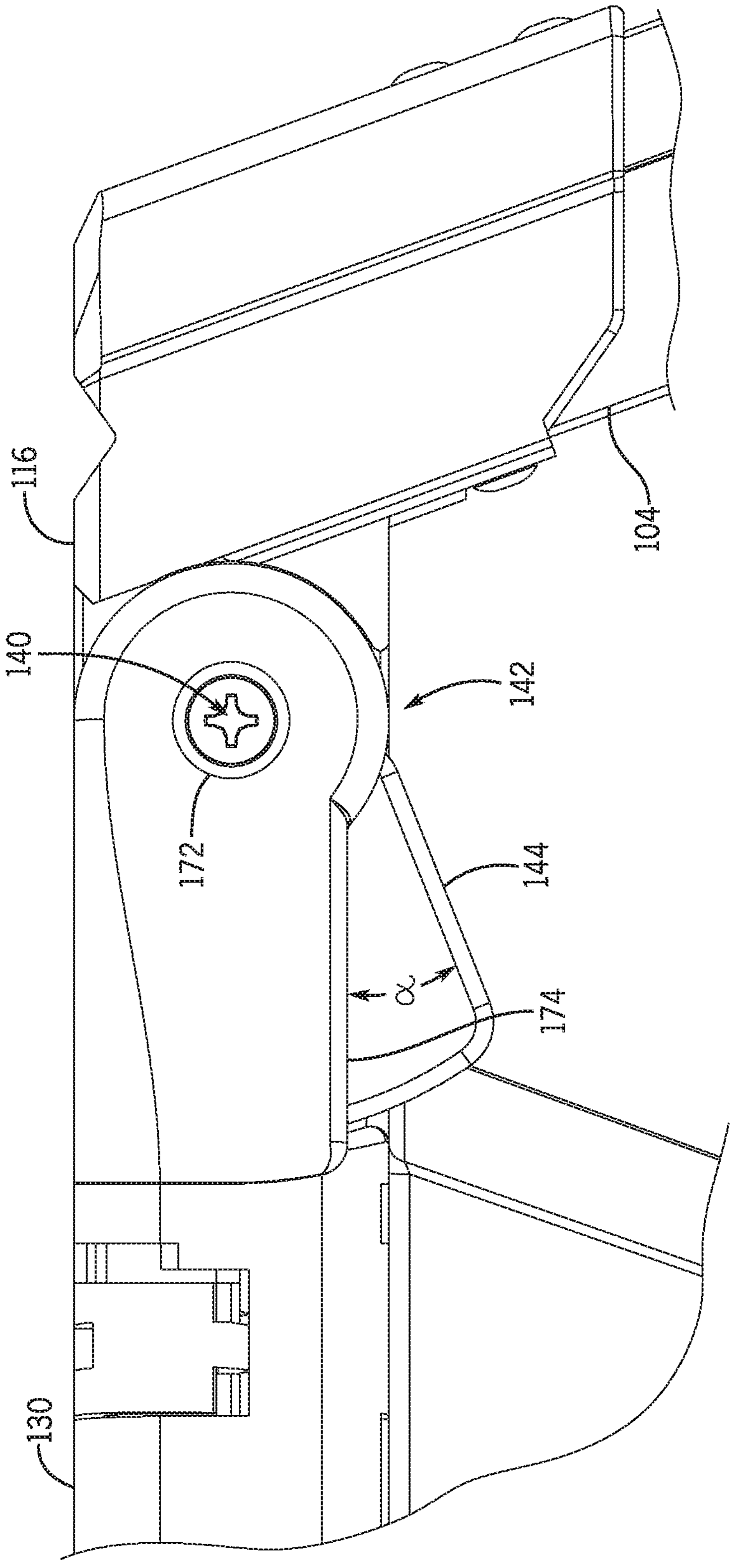
FIG. 5 is an enlarged side view of the an upper portion of the ladder shown in FIG. 1.
Figure 6:
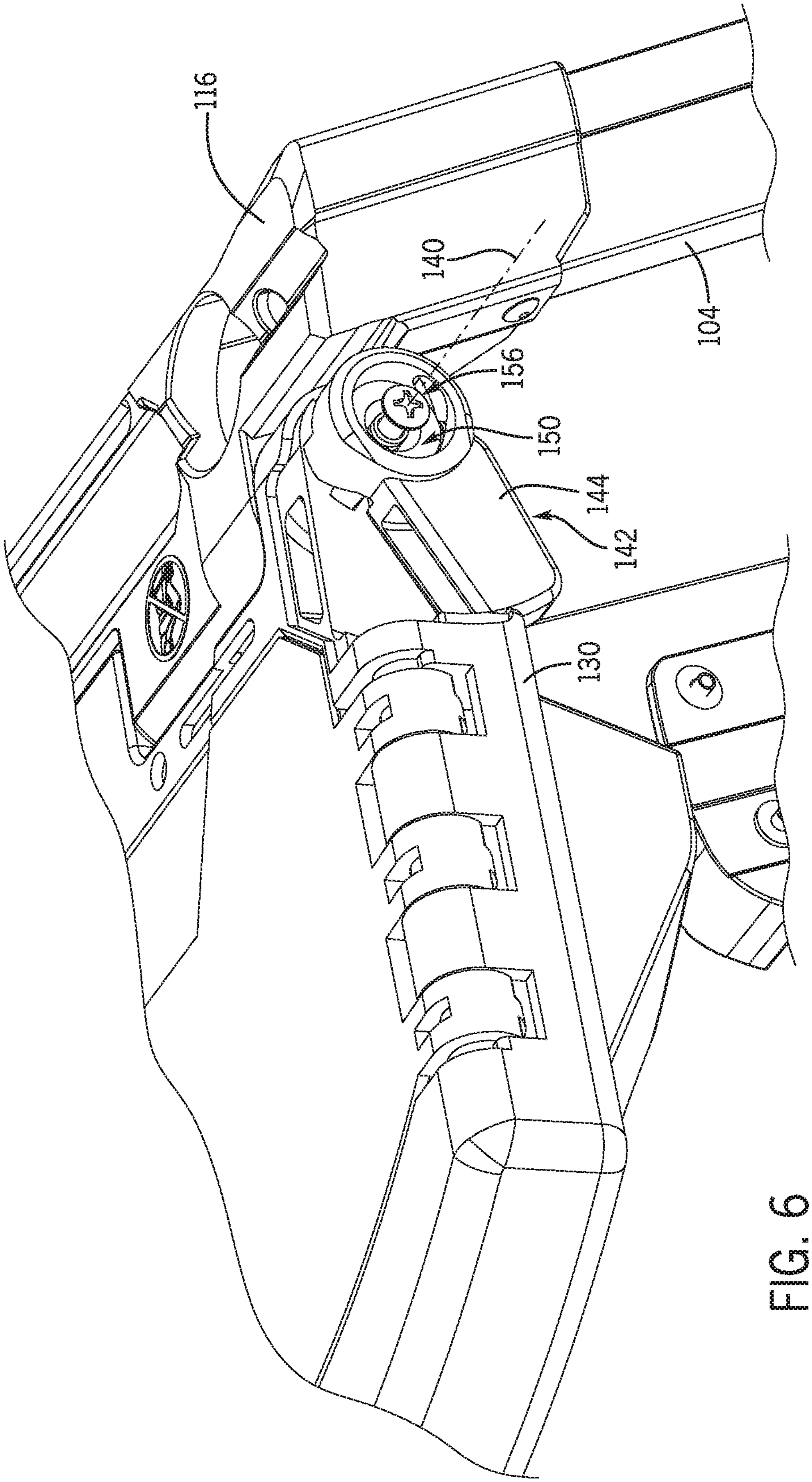
FIG. 6 is an enlarged perspective view of an upper portion of the ladder shown in FIG. 1, with certain components removed.
Figure 7:
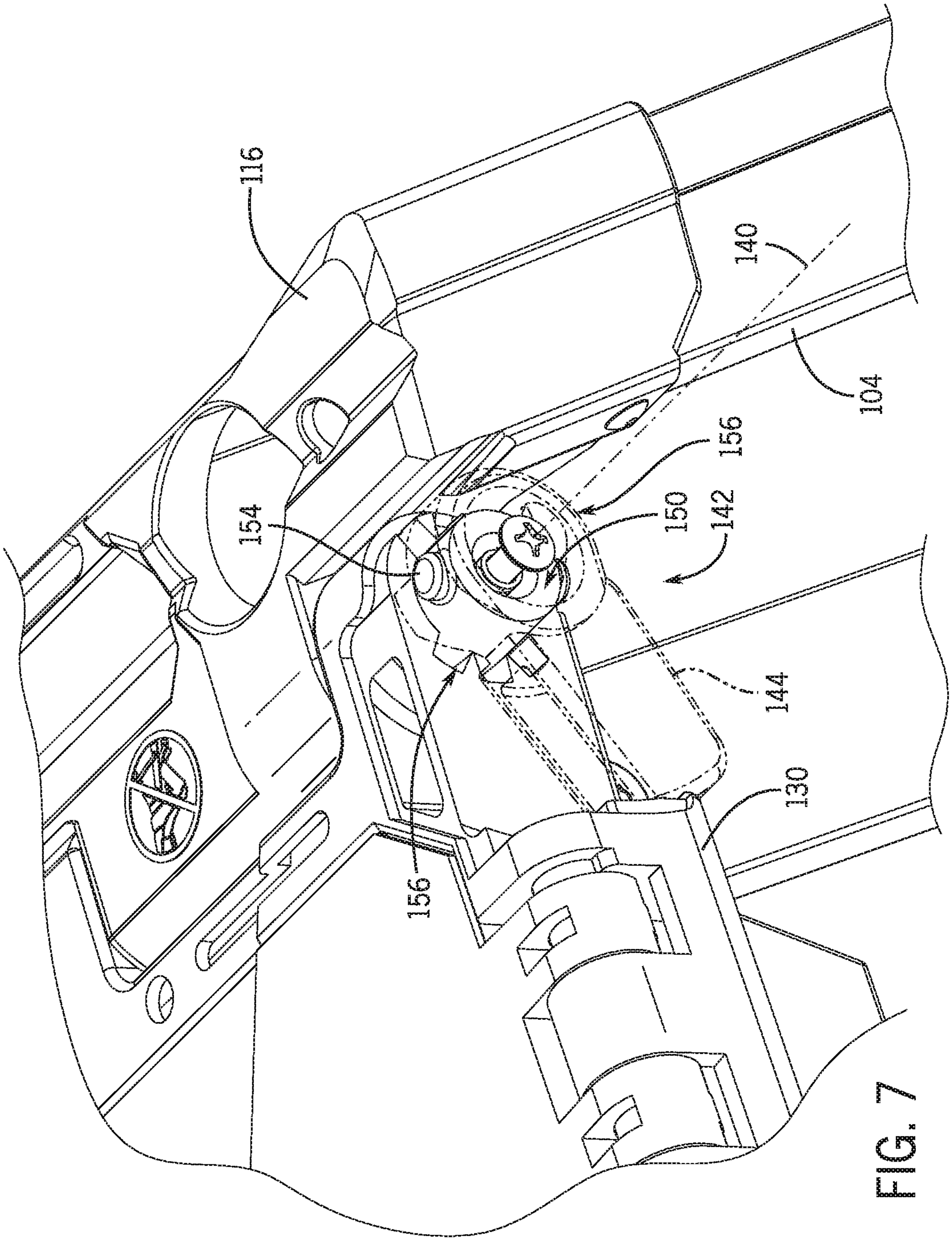
FIG. 7 is an enlarged perspective view of an upper portion of the ladder shown in FIG. 1, with certain components removed and others depicted with transparency to show certain features.
Figure 8:
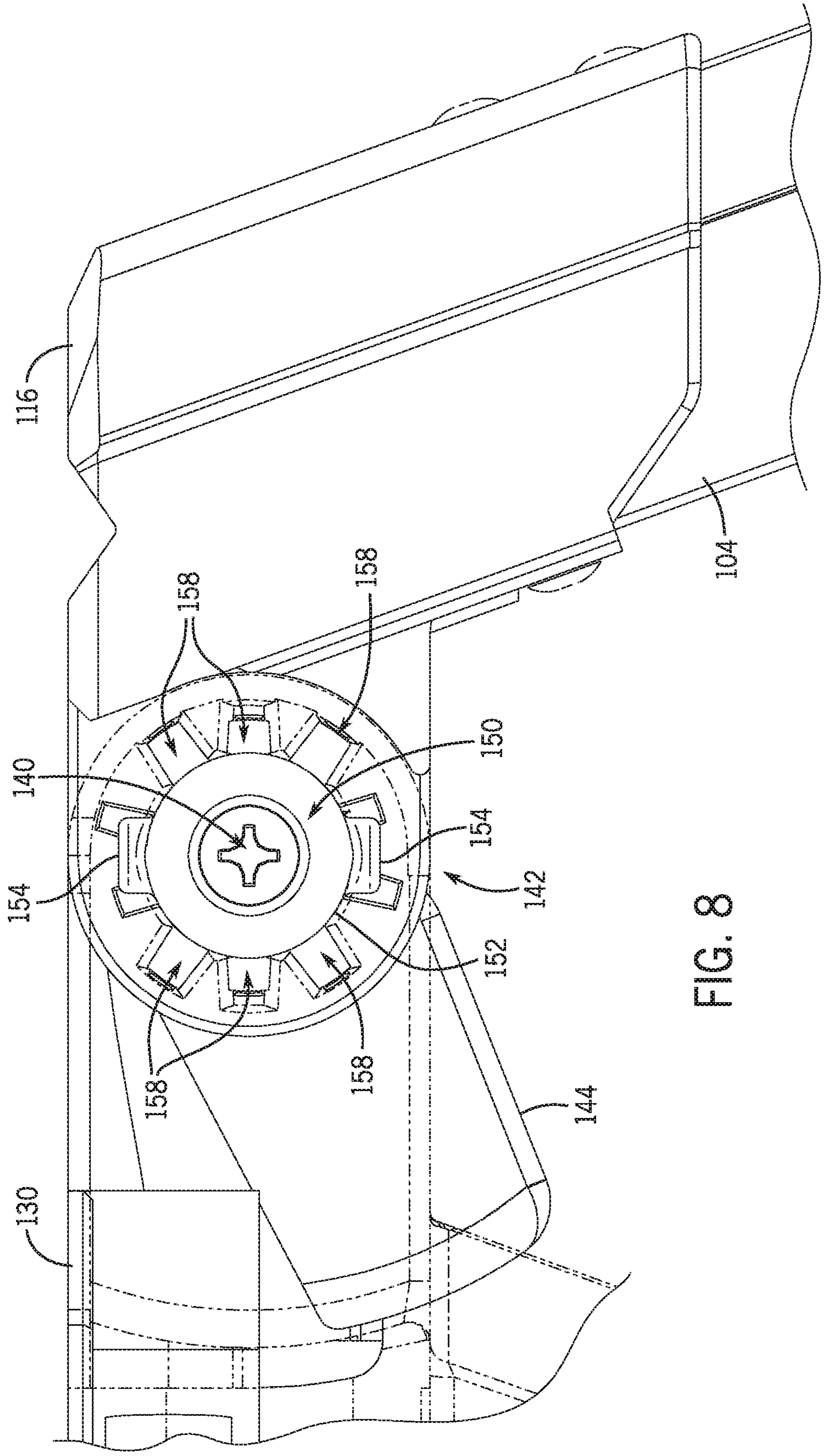
FIG. 8 is a partial sectional view of an upper portion of the ladder shown in FIG. 1.
Figure 9:
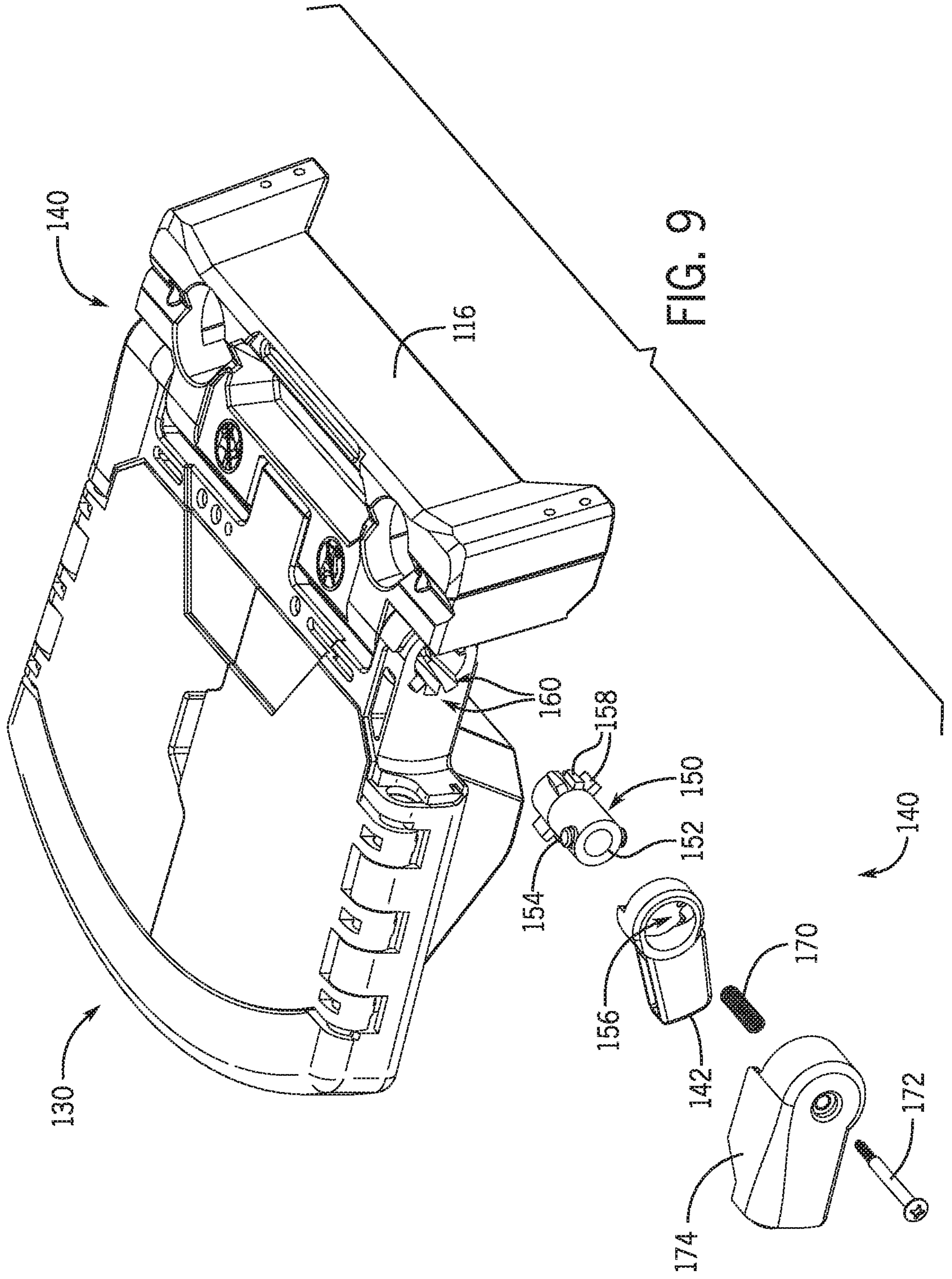
FIG. 9 is a partially exploded view of the ladder top, tray and related components shown in FIG. 1.
Figure 10:
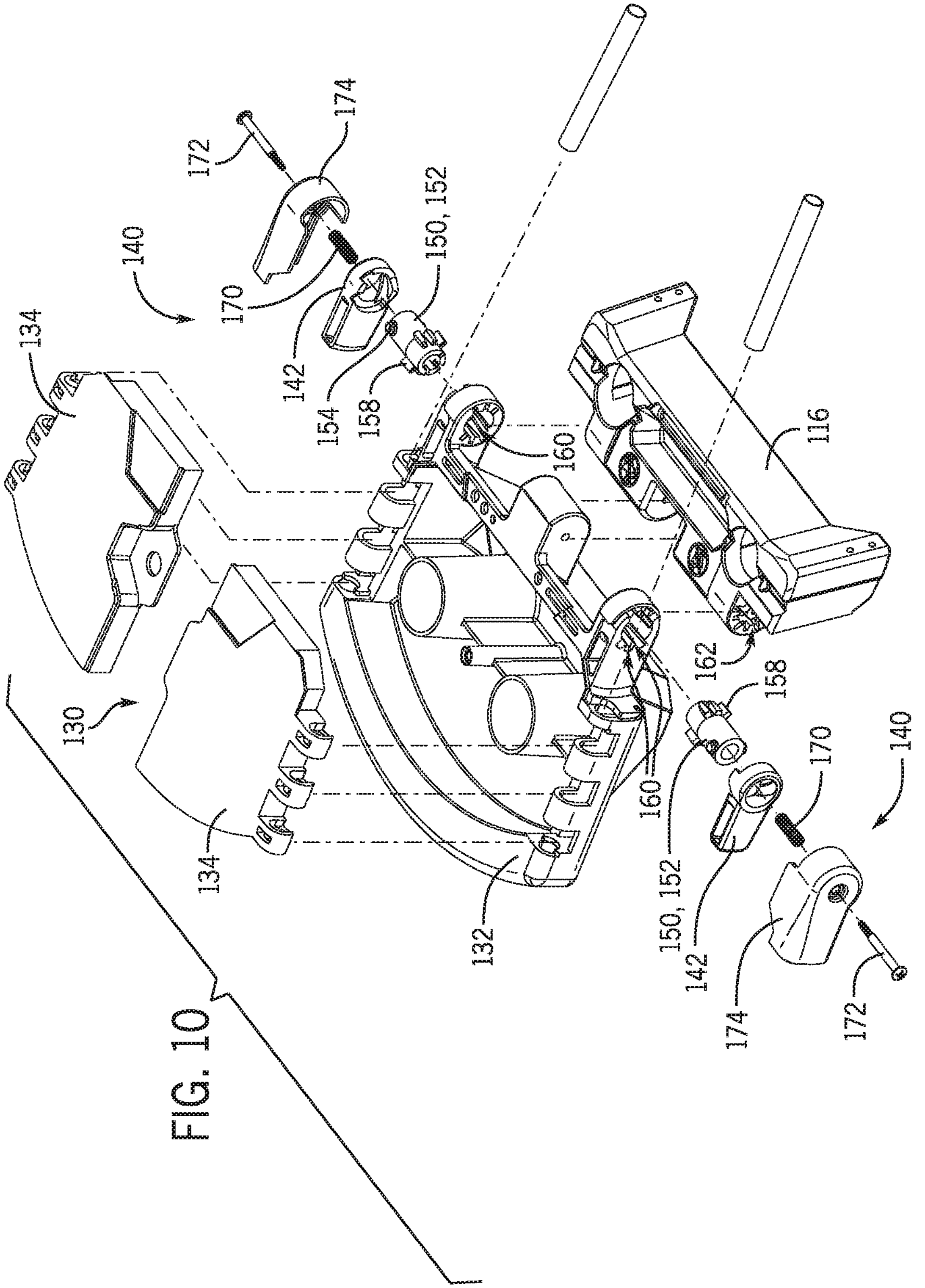
FIG. 10 is an exploded view of the ladder top, tray and related components shown in FIG. 1.

Still referring to FIGS. 5-11, the adjustment mechanisms 142 each include an actuator lever 144, which may also be referred to as a trigger. The actuator lever 144 may be positioned along an underside of the tray 130 and at a laterally outer portion of the tray. The actuator lever 144 may be configured to rotate about the axis 140 through a desire arc or angle of travel. For example, in one embodiment, the actuator lever 142 may be configured to be displaced upwards towards the tray 130 (i.e., rotating clockwise about the axis as seen in FIG. 5) through an angle $\alpha$ that is approximately 22.5 degrees or less. The relatively small angle of travel of the actuator lever 142 enables a user to unlock the tray 130, relative to the top cap 116, with a simple squeezing motion and with reduced effort. Thus, for example, in effecting a position change of the tray 130, a user could stand on the platform 118, engage each the actuator levers 142 with one or more fingers of their hands, and squeeze the actuator levers 142 to unlock the tray 130 relative to the top cap 116.

The actuator lever 142 may be coupled to a locking key 150 that engages and disengages with a portion of the top cap 116 upon displacement of the actuation lever 142. For example, the locking key 150 may include a body 152 having one or more cam followers 154 (e.g., a pin or other protrusion) that engages with one or more camming surfaces 156, such as an angled or curved slot or surface (see, e.g., FIG. 7) formed on or in the actuator lever 142. The locking key 150 further includes one or more male keyed structures which may be formed as gears or teeth 158. The teeth 158 may be shaped, sized, oriented and arranged to mate with female keyed structures which may be formed as recesses or notches in portions of the tray 130 and the top cap 116 (e.g., notches 160 and 162).

When the tray 130 is locked in a desired position relative to the top cap 116, the teeth 158 of the locking key 150 engage notches 160 and 162 of the tray 130 and top cap 116. In some embodiments, when in the locked state, individual teeth 158 may simultaneously engage an associated notch 160 of the tray 130 and an associated notch 162 of the top cap 116, creating an interference and prohibiting rotation of the tray 130. In other embodiments, when in the locked state, one or more of the teeth 158 may engage a notch 160 of the tray 130 while one or more additional teeth 158 may engage a notch 162 of the top cap 116 to prohibit rotation of the tray 130.

To enable rotation of the tray 130 relative to the top cap 116, a user rotates the actuator lever 142 about the rotation axis 140 relative to the tray 130. As the actuator lever 142 rotates about the axis 140, the camming surface 156 engages the cam follower 154 to axially displace the locking key 150 laterally outward along the axis 140. The lateral displacement of the locking key 150 causes the teeth 158 to disengage from any notches 162 formed in the top cap 116, enabling the tray 130 to rotate about the axis 140 relative to the top cap 116 between the various positions described above. While the teeth 158 of the locking key 150 may be disengage from the notches 162 of the top cap 116, one or more of the teeth 158 may still be engaged with notches 160 of the tray 130 to maintain the locking key 150 at a desired orientation or alignment with respect to the tray 130. Thus, as the tray 130 rotates relative to the top cap 116, the actuator lever 142 and locking key 150 rotate concomitantly with the tray 130.

A biasing member 170 can be positioned between the locking key 150 and a portion of the actuator lever 142 (or some associated component such as a fastener 172, cover member 174, or the like), biasing the locking key 130 laterally inward along the axis 140 (i.e., towards engagement with the top cap 116). Thus, as the tray 130 and associated components are rotated about the axis 140, when the teeth 158 of the locking key 150 become aligned with notches 162 of the top cap 116, the biasing member effects axial displacement of the locking key 150 and engagement of the teeth with the notches 162 of the top cap 116 to effect a locking of the tray 130 relative to the top cap 116. The fastening member 172 may extend through and/or couple various components together, including, for example, the cover member 174, the biasing member 170, the actuator lever 142, the locking key 150, and a portion of the top cap 116.

Figure 11:
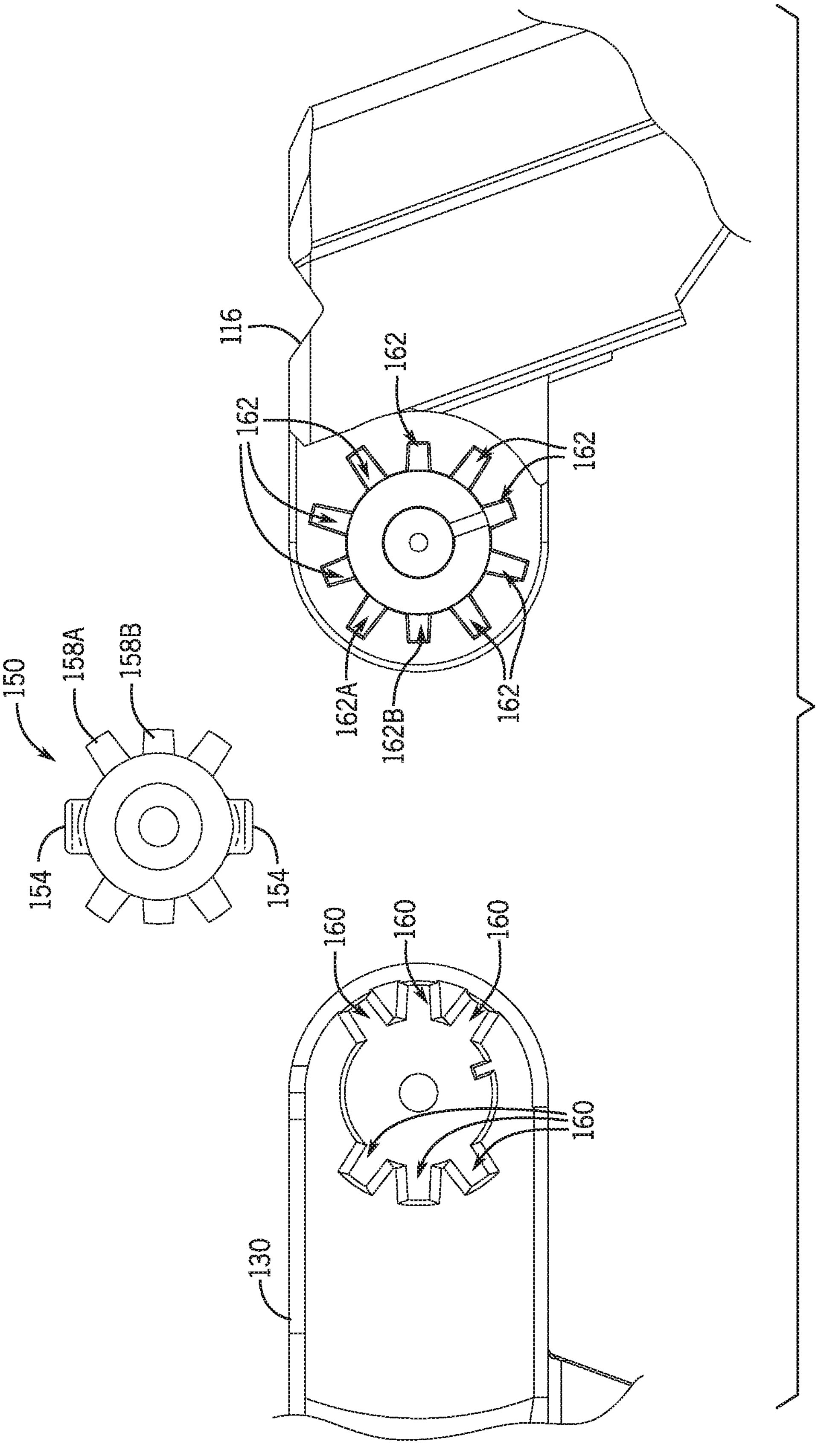
FIG. 11 is a side view of a portion of the tray, a component associated with the locking and adjustment of the tray, and a portion of the ladder top.

As seen in FIG. 11, the teeth 158 of the locking key may include teeth 158A having a first radial length and teeth 158B having a second, greater radial length. Similarly, notches 162 associated with the top cap 116 may include notches 162A having a first radial length and notches 162B having a second, greater radial length. The use of different length teeth 158 and different length notches 162 can help to define the different positions at which the tray 130 may be locked. In other embodiments, rather than using teeth of differing radial lengths, teeth of different shapes, widths, patterns or other configurations may be used to facilitate locking of the tray 130 at specified positions relative to the top cap 116.

While the invention may be susceptible to various modifications and alternative forms, specific embodiments have been shown by way of example in the drawings and have been described in detail herein. However, it should be understood that the invention is not intended to be limited to the particular forms disclosed. Additionally, features of one embodiment may be combined with features of other embodiments without limitation. The invention includes all modifications, equivalents, and alternatives falling within the spirit and scope of the invention as defined by the following appended claims.

What is claimed is:

1. A ladder comprising:

a first pair of spaced apart rails;

at least one rung extending between and coupled with the first pair of spaced apart rails;

a top cap directly coupled with the first pair of spaced apart rails;

a second pair of spaced apart rails;

a pair of hinges coupling the first pair of spaced apart rails with the second pair of spaced apart rails;

a tray hingedly directly coupled with the top cap by at least one tray hinge, the tray being selectively lockable relative to the top cap in a first deployed position and a stored position, wherein:

when the tray is in the stored position, the tray extends downward from the at least one tray hinge toward the pair of hinges, and when the tray is locked in the first deployed position, the tray extends generally upward from the at least one tray hinge and generally parallel with a plane defined by a front face of the first pair of spaced apart rails.

2. The ladder of claim 1, wherein the tray includes a body portion defining an interior volume and at least one panel coupled with the body portion and configured to cover the interior volume.

3. The ladder of claim 1, further comprising at least one adjustment mechanism associated with the tray and configured to selectively lock the tray in the first deployed position and the stored position.

4. The ladder of claim 3, wherein the at least one adjustment mechanism includes an actuator lever positioned along a lower side of the tray.

5. The ladder of claim 4, wherein the actuator lever is further positioned along a laterally outer side of the tray adjacent to a rail of the first pair of spaced apart rails.

6. The ladder of claim 5, wherein the actuator lever is coupled with a locking key that extends along an axis of rotation between the tray and the top cap.

7. The ladder of claim 6, wherein the locking key includes a body portion having at least one tooth formed thereon, and wherein the top cap includes at least one notch, the at least one tooth being configured to selectively engage the at least one notch.

8. The ladder of claim 7, wherein the at least one tooth includes at least a first tooth having a first radial length and a second tooth having a second radial length, wherein the first radial length is greater than the second radial length.

9. The ladder of claim 7, wherein the actuator lever includes a camming surface that engages a cam follower of the locking key.

10. The ladder of claim 9, further comprising a biasing member positioned between a portion of the actuator lever and a portion of the locking key.

11. The ladder of claim 9, wherein rotation of the actuator lever about the axis of rotation displaces the locking key axially along the axis of rotation.

12. The ladder of claim 10, wherein the actuator lever is configured to rotate about the axis of rotation approximately 22.5 degrees or less.

13. The ladder of claim 1, wherein the first pair of spaced apart rails and the second pair of spaced apart rails are configured to be positioned relative to each other in a first, deployed state and a second, stored state, wherein when the second, stored state the first pair of spaced apart rails are positioned adjacent to and extend substantially parallel to the second pair of spaced apart rails.

14. The ladder of claim 13, wherein a maximum depth of the ladder is defined by a distance between a front surface of the first pair of spaced apart rails and a rear surface of the second pair of spaced apart rails when the first pair of spaced apart rails and the second pair of spaced apart rails are in the second, stored state, and when the tray is in the stored position.

15. The ladder of claim 1, wherein the tray is positionable via the at least one tray hinge relative to the top cap in a second deployed position, when in the second deployed position, the tray extends substantially horizontally from the top cap.

16. The ladder of claim 1, further comprising a platform step extending between and coupled with the first pair of spaced apart rails.

17. The ladder of claim 1, wherein the top cap does not contact the second pair of spaced apart rails.

18. The ladder of claim 1, wherein the top cap includes at least one storage compartment.

19. A ladder comprising:

a first pair of spaced apart rails comprising a pair of front surfaces;

at least one rung extending between and coupled with the first pair of spaced apart rails;

a top cap coupled with the first pair of spaced apart rails;

a second pair of spaced apart rails comprising a pair of rear surfaces;

a pair of hinges coupling the first pair of spaced apart rails with the second pair of spaced apart rails;

a tray hingedly directly coupled with the top cap and rotatable about a fixed axis between a deployed position and a stored position, wherein when the tray is in the stored position:

the tray extends downward from the top cap toward the pair of hinges, a bottom surface of the tray is parallel to, and adjacent to, rear surfaces of the first pair of spaced apart rails, and the tray lies within a volumetric envelope defined by the pair of front surfaces and by the pair of rear surfaces.

20. A ladder comprising:

a first pair of spaced apart rails;

at least one rung extending between and coupled with the first pair of spaced apart rails;

a top cap coupled with the first pair of spaced apart rails and including at least one notch;

a second pair of spaced apart rails;

a pair of hinges coupling the first pair of spaced apart rails with the second pair of spaced apart rails;

a tray hingedly coupled with the top cap and selectively positioned between a deployed position and a stored position, wherein when the tray is in the stored position, the tray extends downward from the top cap toward the pair of hinges; and at least one adjustment mechanism directly coupled with a lateral side of the tray and configured to selectively lock the tray in the deployed position and in the stored position, the at least one adjustment mechanism comprising a locking key and an actuator lever attached to the tray, the actuator lever being rotatable between a first position extending at an angle extending at least partially away from the tray and a second position aligned with the tray, the locking key including at least one tooth configured to selectively engage the at least one notch.

21. The ladder of claim 20, wherein the actuator lever is positioned laterally external to the lateral side of the tray.

22. The ladder of claim 20, further comprising a cover member overlaying the actuator lever.

* * * * *